(12) United States Patent
Jeschke

(10) Patent No.: US 7,477,678 B2
(45) Date of Patent: Jan. 13, 2009

(54) METHOD OF FINDING DELAYS OF A MULTIPATH CHANNEL

(75) Inventor: Michael Jeschke, Stuttgart (DE)

(73) Assignee: Evolium S.A.S., Paris (FR)

( * ) Notice: Subject to any disclaimer, the term of this patent is extended or adjusted under 35 U.S.C. 154(b) by 804 days.

(21) Appl. No.: 10/975,376

(22) Filed: Oct. 29, 2004

(65) Prior Publication Data

US 2005/0111527 A1 May 26, 2005

(30) Foreign Application Priority Data

Nov. 22, 2003 (EP) .................................. 03027017

(51) Int. Cl.
*H04B 1/707* (2006.01)
(52) U.S. Cl. ..................................... 375/148
(58) Field of Classification Search ................ 375/147, 375/148; 370/335, 342, 441
See application file for complete search history.

(56) References Cited

U.S. PATENT DOCUMENTS

| | | |
|---|---|---|
| 6,370,183 B1 | 4/2002 | Newson et al. |
| 6,430,166 B1 | 8/2002 | Bejjani et al. |
| 6,560,273 B1 | 5/2003 | Sourour et al. |
| 6,580,749 B1 * | 6/2003 | Miura ........................ 375/147 |
| 7,142,586 B2 * | 11/2006 | Reial ........................... 375/148 |
| 2005/0047485 A1 * | 3/2005 | Khayrallah et al. ......... 375/148 |

FOREIGN PATENT DOCUMENTS

| | | |
|---|---|---|
| EP | 1 052 783 A2 | 11/2000 |
| WO | WO 01/76087 A1 | 10/2001 |

OTHER PUBLICATIONS

Win, Moe Z et. al.., "Impact of Spreading Bandwidth on Rake Reception in Dense Multipath Channels, IEEE Journal On Selected Areas In Communications," pp. 1794-1806, vol. 17, No. 10, Oct. 1999.

Win, Moe Z , et al., "Performance of Rake Reception in Dense Multipath Channels: Implications of Spreading Bandwidth and Selection Diversity Order," IEEE Journal on Selected Areas in Communications, pp. 1516-1525, vol. 18, No. 8, Aug. 2000.

Win, Moe Z. "Virtual Path Analysis of Selective Rake Receiver in Dense Multipath Channels," IEEE Communications Letters, pp. 308-310, vol. 3, No. 11, Nov. 1999.

* cited by examiner

*Primary Examiner*—Betsy L Deppe
(74) *Attorney, Agent, or Firm*—Sughrue Mion, PLLC

(57) ABSTRACT

A method of finding delays of a multipath channel for receiving a spread spectrum signal, the multipath channel having a maximum delay spread, includes the steps of performing a first delay search within a time window in order to find first delays, the time window being located within the maximum delay spread, storing of the first delays in a delay storage, shifting the time window within the maximum delay spread, performing a second delay search within the shifted time window in order to find second delays and updating the delay storage on the basis of the second delays.

7 Claims, 2 Drawing Sheets

METHOD OF FINDING DELAYS OF A MULTIPATH CHANNEL

BACKGROUND OF THE INVENTION

The invention is based on a priority application EP 03027017.7 which is hereby incorporated by reference.

This invention relates to the field of telecommunication and, more particularly, to spread spectrum telecommunication systems.

In a typical RF communication system, a transmitted signal may travel from a transmitter to a receiver over multiple paths, for example a direct path and also a reflected path. Each path may be considered a separate channel which is subject to the effects of fading, dispersion, etc. Moreover, the combination of signals at the receiver can result in additional fading. Such operating environments are known as multipath fading environments. Direct sequence spread spectrum (DS-SS) receivers can operate in multipath fading environments. A DS-SS receiver typically includes a Rake receiver, which demodulates a received signal using plural demodulation "fingers", often referred to as Rake fingers. Each Rake finger demodulates the component signal from a number of the channel paths (such component signal referred to as a multipath component). The outputs of the Rake fingers are combined for improved performance.

With multipath channels a transmitted signal arrives in components, with each component having a different delay. The components can be distinguished and resolved if the delays are of sufficient duration. However, in order to demodulate the signals, the Rake receiver must know the delay of each channel path.

Typically, a Rake receiver operates in conjunction with a delay searcher and a delay tracker. The delay searcher analyzes a received signal and finds the delays. These delays are assigned to the Rake fingers. However, in mobile telecommunications the channels may be subject to additional fading due to the motion of the receiver. A delay tracker tracks the delays assigned by the searcher between channel searches. Thus, while the searcher looks over a wide range of delays, the trackers look over a smaller range surrounding the assigned delays.

U.S. Pat. No. 6,560,273 shows a DS-SS receiver for operating in a multipath fading channel. The system comprises a Rake receiver having plural Rake fingers. Each Rake finger demodulates a received signal from one of a plurality of channel paths. The output of the plural Rake fingers are combined. Each Rake finger utilizes a select assigned delay to synchronize to a delay of the one channel path. A searcher periodically performs a channel search on the received signal to detect new delays of strongest paths in the channel. Plural trackers, one for each channel path, adjust the select assigned delays between searches performed by the searcher. A delay controller is operatively coupled to the searcher and the trackers. The delay controller compares new delays of the strongest paths from the searcher to the select assigned delays and reassigns one of the select assigned delays with one of the new delays only if the new delay differs from the one select assigned delay more than a predetermined threshold.

U.S. Pat. No. 6,430,166 is aimed to increase the performance of a demodulator in a CDMA receiver by cascading of path searchers in order to obtain an optimized channel profile.

U.S. Pat. No. 6,370,183 shows a Rake receiver with a finger for each of a plurality of multipath components displaced in time. Short-term variations in the strength of each component are predicted and the coefficients of each finger are adapted accordingly, with the aim to reduce the error rate, particularly in high-data-rate applications in a time-variant environment.

Further, delay spread and its impact on Rake reception in spread spectrum telecommunication systems is discussed in the scientific literature (cf. Impact of spreading bandwidth on RAKE reception in dense multipath channels *Communication Theory Mini-Conference*, 1999, Win, M. Z.; Kostic, Z. Pages: 78-82; Performance of RAKE reception in dense multipath channels: implications of spreading bandwidth and selection diversity order. *Selected Areas in Communications, IEEE Journal on*, Win, M. Z.; Chrisikos, G.; Sollenberger, N. R. Pages: 1516-1525; Impact of spreading bandwidth on RAKE reception in dense multipath channels *Selected Areas in Communications, IEEE Journal on*, Win, M. Z.; Kostic, Z. A. Pages: 1794-1806; Virtual path analysis of selective RAKE receiver in dense multipath channels *Communications Letters, IEEE*, Win, M. Z.; Kostic, Z. A. Pages: 308-310).

The present invention aims to provide an improved method of finding delays of a multipath channel, in particular for the purpose of Rake reception of spread spectrum signals.

SUMMARY OF THE INVENTION

The present invention provides for a method of finding delays of a multipath channel having a maximum delay spread for receiving a spread spectrum signal. In other words, a receiver (searcher) is used that is able to identify paths within a maximum delay spread that is considered for the search.

A first delay search is performed within the time window that is located within the maximum delay spread. The delays that have been identified in the first delay search are stored in a delay storage e.g. for access by a Rake receiver. Alternatively the delay storage is an integral part of the Rake receiver.

For a consecutive delay search the time window is shifted within the maximum delay spread. A second delay search is performed within the shifted time window. The delay storage is updated by means of the delays that are identified in the second delay search.

The present invention is particularly advantageous as it enables to perform delay searches within a time window having a length below the maximum delay spread. This facilitates the design of a delay searcher having a reduced complexity, e.g. a reduced number of correlators. Still the maximum delay spread is covered by periodically shifting the time window within the maximum delay spread.

In accordance with a preferred embodiment of the invention a repetition pattern is used to determine the position of the time window within the maximum delay spread for each periodic repetition. Preferably the repetition pattern is chosen such that a middle portion of the maximum delay spread is covered by the time window in each periodic repetition of the delay search.

In accordance with a further preferred embodiment of the invention the length of the time window is chosen such that a central portion of the maximum delay spread is covered in each periodic repetition of the delay searches.

This way more delay searches are performed in the middle and central portions of the maximum delay spread in comparison to the border portions of the maximum delay spread. Hence, delays are identified with about the same precision in comparison to a full delay search performed over the maximum delay spread during each repetition as the mean live times of signal paths in the middle and center portions of the maximum delay spread are usually much shorter than the mean life times of channel paths having delays in the border portions of the maximum delay spread.

It is to be noted that the present invention is particularly advantageous for application in code division multiple access (CDMA) type wireless mobile communication systems. The present invention can be employed both for Rake reception by a network component and for Rake reception by a user equipment.

BRIEF DESCRIPTION OF THE DRAWINGS

In the following preferred embodiments of the invention will be explained in greater detail by way of example only, and by making reference to the drawings in which.

DETAILED DESCRIPTION OF THE DRAWINGS

Figure 1:
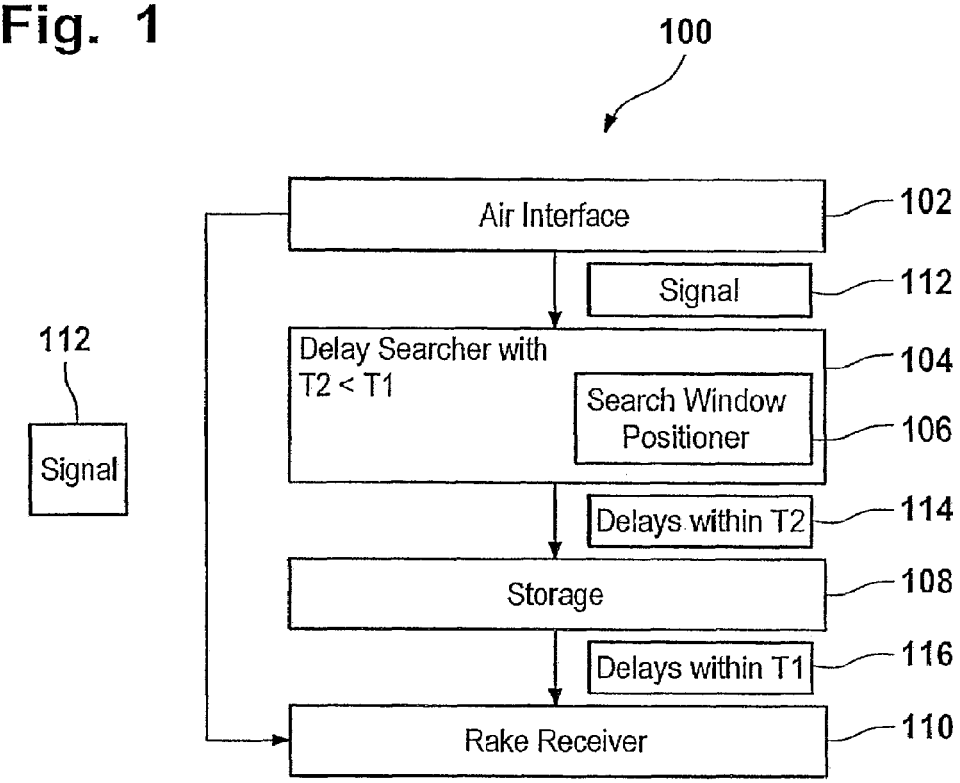
FIG. 1 is a schematic block diagram of an embodiment of a receiver in accordance with the invention.

FIG. 1 shows receiver 100 having air interface 102 for receiving multipath components of a spread spectrum signal, such as a CDMA or wide band W-CDMA signal.

Receiver 100 has delay searcher 104 for determining path delays within a time window having a length T2 that is shorter than the length T1 of the maximum delay spread of the multipath channel. Delay searcher 104 has positioner 106 for positioning the time window within the maximum delay spread.

For example delay searcher 104 can be implemented by means of a number of N correlators that work simultaneously. Each of these correlators correlates the received signal with the known receiver signal's spreading sequence over a fixed correlation length, such as 10 milliseconds. Typically the N correlators are organized in an "equidistant" way. For example the distance is $\Delta t = 1/2$ chip or $1/4$ chip where e.g. in UMTS one chip has a duration of approximately 0.26 microseconds.

In other words the received signal is shifted against the spreading sequence by $\Delta t$ in each correlator compared to the neighboring correlator. Hence the number N of correlators that are required for implementing delay searcher 104 is proportional to the length T2 of the time window for a given time resolution of the delay search.

As the length T2 of the time window in which the delay searches are performed by delay searcher 104 is smaller than the maximum delay spread, the number N of correlators can be reduced correspondingly in comparison to prior art delayed searchers without compromising the time resolution. This is accomplished by means of positioner 106 that periodically varies the position of the time window for performing the delay searches within the maximum delay spread in order to cover the maximum delay spread over a number of periodic repetitions of the delay searches.

Further receiver 100 has delay storage 108 for storing of the delays identified by delay searcher 104. These delays are used by Rake receiver 110 for configuration of its Rake fingers. Delay storage 108 can be separate from Rake receiver 110 or it can form an integral part of Rake receiver 110.

In operation air interface 102 receives spread spectrum signal 112 that has various multipath components. Signal 112 is provided to delay searcher 104 and to Rake receiver 110. Delay searcher 104 performs a delay search within the time window of length T2 in order to identify the delays of paths within the time window. The delays 114 delay searcher 104 has found within time window of length T2 are entered into storage 108 for access by Rake receiver 110.

This procedure is carried out repetitively whereby the position of the time window for performing the delay search is periodically shifted within the maximum delay spread by positioner 106. Hence, delay searcher 104 covers the maximum delay spread interval over two or more periodic repetitions such that delay storage 108 does not only store delays 114 that are identified within the short time window of length T2 but also delays 116 distributed over the entire delay range given by the maximum delay spread of T1.

The content of delay storage 108 is updated as a result of each periodic repetition by means of the newly determined delays 114. For example, delays 114 that have been identified by a previous delay search performed at the same position of the time window which are no longer identified by the actual delay search are deleted within delay storage 108 and replaced by the new delays 114.

Alternatively or in addition the delay values are low pass filtered. Preferably all delay values within the actual time window of length T2 are low pass filtered whereas the delays outside the actual time window of length T2 remain unchanged. Preferably not only the delays themselves but also the peak values of the delays are stored in order to perform the low-pass filtering.

Alternatively each delay that is entered into delay storage 108 has an assigned mean delay life time. After the mean delay life time has expired the corresponding delay is erased from delay storage 108. In other words an aging mechanism is used to replace delays by new ones.

Figure 2:
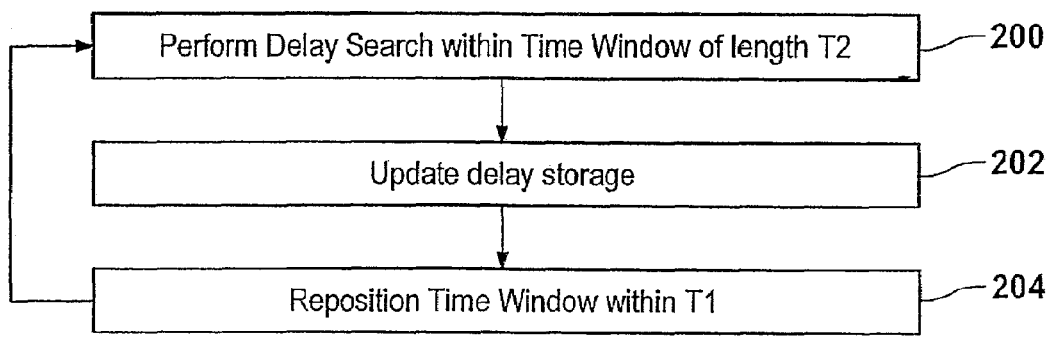
FIG. 2 is a flow chart illustrating an embodiment of a method of the invention.

FIG. 2 shows a corresponding flow chart. In step 200 a delay search is performed by the delay searcher within a time window having a length of T2 that is below length T1 of the maximum delay spread of the multipath channel. In step 202 the delay storage is updated by means of the newly determined delays. In step 204 the time window is repositioned within the maximum delay spread 300 and the control goes back to step 200.

The repositioning or shifting of the time window in step 204 can be performed randomly, pseudo randomly, or in accordance with a predetermined repetition pattern.

Figure 3:
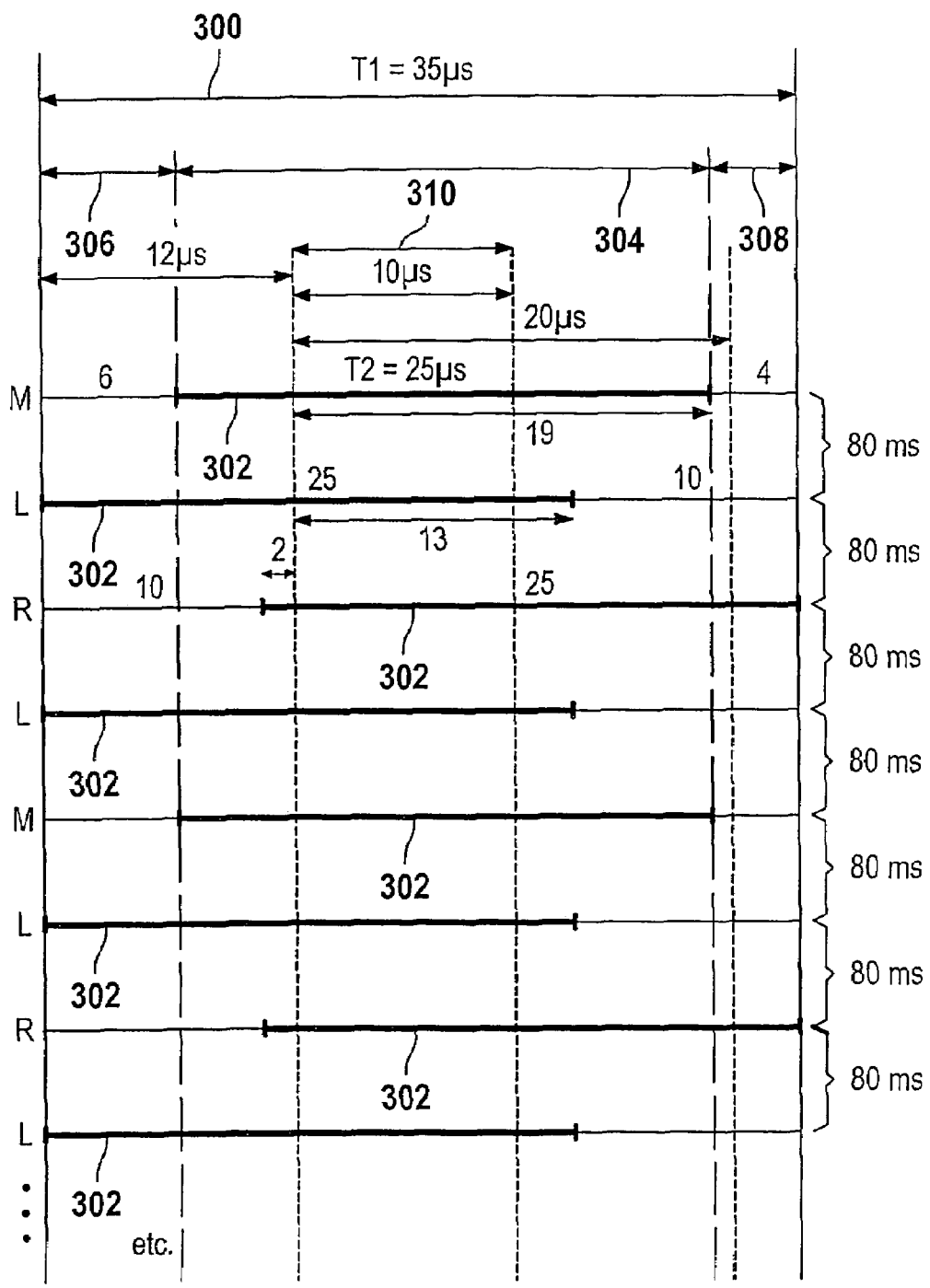
FIG. 3 illustrates a repetition pattern for periodically shifting the time window for performing the delay search within the maximum delay spread.

An implementation example that is based on a predetermined repetition pattern is illustrated in FIG. 3. FIG. 3 shows maximum delay spread 300. Typically maximum delay spread 300 has length T1 of about 35 microseconds for a typical multipath channel used in spread spectrum telecommunication systems. The actual delay spread under current reception conditions may be longer or shorter than maximum delay spread 300. However, maximum delay spread 300 is assumed to be a constant value for all reception conditions for the purpose of a practical receiver implementation.

Time window 302 is located within maximum delay spread 300. Time window 302 has length T2 that is below length T1 of maximum delay spread 300. In the example considered here a length T2 of 25 microseconds has been chosen. Delay searches are performed by the delay searcher periodically at intervals of 80 microseconds. The position of time window 302 within maximum delay spread 300 is determined for each periodic repetition by a repetition pattern. In the preferred embodiment considered here the repetition pattern consists of the three positions middle M, left L and right R as illustrated in FIG. 3.

In the middle position M window 302 covers middle portion 304 of maximum delay spread 300. In the position L time window 302 covers left border portion 306 of maximum delay spread 300 in addition to some of middle portion 304. In the right position R time window 302 covers right border portion 308 of maximum delay spread 300 in addition to some of middle portion 304. In any of the positions given by the repetition pattern time window 302 covers central portion 310 of maximum delay spread 300.

By shifting of time window of 302 within maximum delay spread 300 between the periodic repetitions in accordance with the predetermined repetition pattern, i.e. M, L, R, L, M, ..., the total extent of maximum delay spread 300 is covered. It is to be noted that the frequency of the delay searches varies for different portions of maximum delay spread 300.

In the preferred embodiment considered here central portion 310 of maximum delay spread 300 is searched for path delays in each repetition. Most of middle portion 304 is also covered by all repetitions of the delay searches. The left border portion 306 and the right border portion 308 are only searched in every second or every fourth repetition of the delay search, respectively. Still the precision of the delay search is satisfactory as the mean life time of a channel path having a delay within central portion 310 is typically shorter than the mean life time of a channel path having a delay within middle portion 304 or one of the border portions 306 or 308.

It is to be noted that the present invention can be implemented by software, hardware or a combination of both software and hardware. The delay search of the multipath channel is preferably performed by hardware that is programmed correspondingly, e.g. a field programmable gate array (FPGA). Further it is preferred to realize the correlator bank by means of hardware whereas the storage of the delays, the low pass filtering and the maximum search, if any, is performed by software.

LIST OF REFERENCE NUMERALS 100 receiver
102 air interface
104 delay searcher
106 positioner
108 delay storage
110 rake receiver
112 signal
114 delays
116 delays
300 maximum delay spread
302 time window
304 middle portion
306 left border portion
308 right border portion
310 central portion

The invention claimed is:

1. A method of finding delays of a multipath channel for receiving a spread spectrum signal, the multipath channel having a maximum delay spread, the method comprising the steps of:
performing a first delay search within a time window in order to find first delays, the time window being located within the maximum delay spread,
storing the first delays in a delay storage,
shifting the time window within the maximum delay spread,
performing a second delay search within the shifted time window in order to find second delays,
updating the delay storage on the basis of the second delays,
wherein the length of the time window and a repetition pattern for shifting the time window are selected such that a central portion of the maximum delay spread is covered by each of the delay searches.

2. The method of claim 1, the delay storage being accessible by or forming part of a Rake receiver.

3. The method of claim 1, further comprising periodically shifting the time window within the maximum delay spread for periodically performing delay searches, the respective window positions within the maximum delay spread being predetermined by the repetition pattern.

4. A computer program product, stored on a computer-readable medium, for finding delays of a multipath channel, the multipath channel having a maximum delay spread, the computer program product comprising instructions for:
performing a first delay search within a time window in order to find first delays, the time window being located within the maximum delay spread,
storing the first delays in a delay storage,
shifting the time window within the maximum delay spread,
performing a second delay search within the shifted time window in order to find second delays,
updating the delay storage on the basis of the second delays,
wherein the length of the time window and a repetition pattern for shifting the time window are selected such that a central portion of the maximum delay spread is covered by each of the delay searches.

5. The computer program product of claim 4, further comprising instructions for periodically shifting the time window within the maximum delay spread for periodically performing delay searches, the respective window positions within the maximum delay spread being predetermined by athe repetition pattern.

6. A network component of a digital spread spectrum telecommunication system, the network component comprising:
means for receiving a spread spectrum signal via a multipath channel having a maximum delay spread,
means for performing delay searches within a time window,
means for shifting the time window within the maximum delay spread,
means for storing the delays identified in the delay searches,
wherein the means for shifting the time window comprises a repetition pattern, for shifting the time window and
wherein the length of the time window and the repetition pattern are arranged such that a central portion of the maximum delay spread is covered by each delay search.

7. A user equipment for receiving a spread spectrum signal via a multipath channel having a maximum delay spread, the user equipment comprising:
means for receiving a spread spectrum signal via a multipath channel having a maximum delay spread,
means for performing delay searches within a time window,
means for shifting the time window within the maximum delay spread,
means for storing the delays identified in the delay searches,
wherein the means for shifting the time window comprises a repetition pattern, for shifting the time window and
wherein the length of the time window and the repetition pattern are arranged such that a central portion of the maximum delay spread is covered by each delay search.

* * * * *